J. J. PETERS.
ATTACHMENT TO CARS.
APPLICATION FILED JAN. 12, 1915.
1,147,813.
Patented July 27, 1915.
2 SHEETS—SHEET 1.
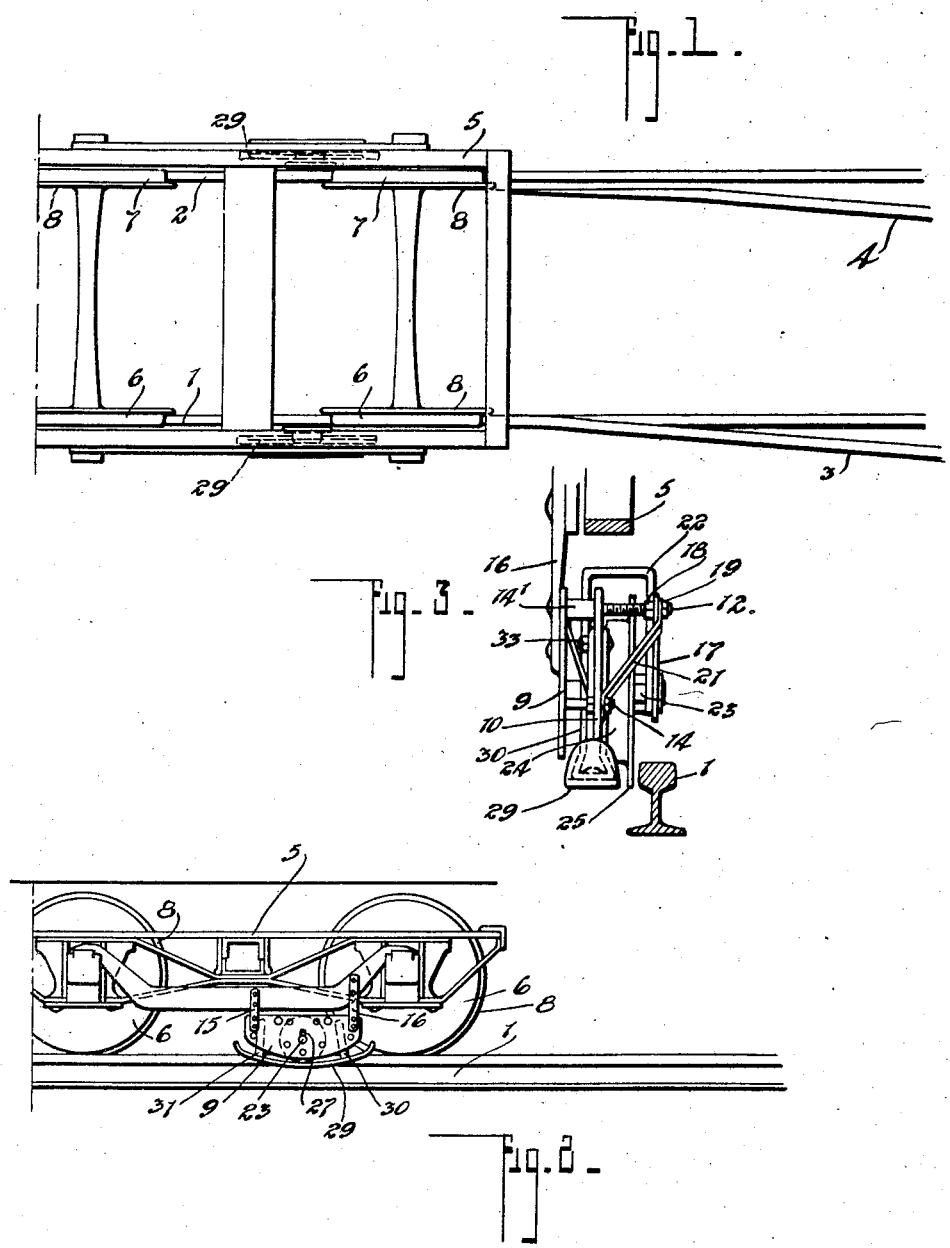
WITNESSES
INVENTOR
J. J. PETERS
By
Attorney.

J. J. PETERS.
ATTACHMENT TO CARS.
APPLICATION FILED JAN. 12, 1915.
1,147,813.
Patented July 27, 1915.
2 SHEETS—SHEET 2.
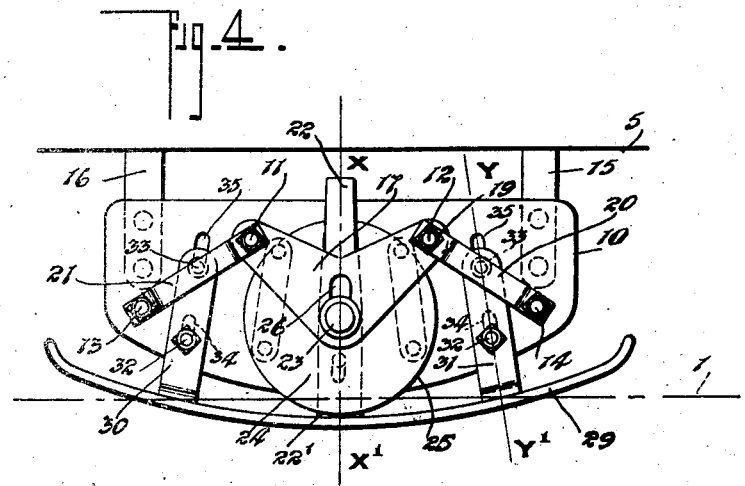
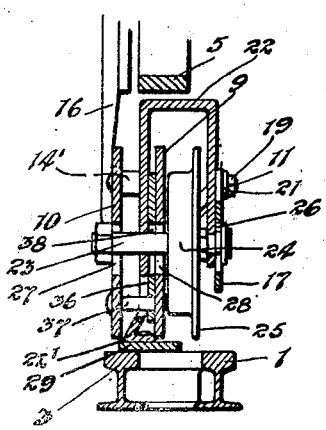
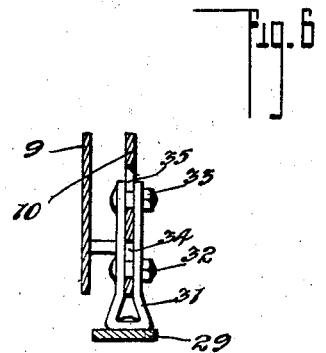
WITNESSES
INVENTOR
J. J. PETERS
By
Attorney.

UNITED STATES PATENT OFFICE.

JOHANN J. PETERS, OF REINFELD, SASKATCHEWAN, CANADA.

ATTACHMENT TO CARS.

1,147,813.  Specification of Letters Patent. Patented July 27, 1915.

Application filed January 12, 1915. Serial No. 1,758.

*To all whom it may concern:*

Be it known that I, JOHANN J. PETERS, of the village of Reinfeld, in the Province of Saskatchewan, Canada, have invented certain new and useful Improvements in Attachments to Cars, of which the following is the specification.

The invention relates to improvements in attachments to cars and the object of the invention is to provide an attachment of the above kind which can be readily secured to a car truck and when applied will act as a preventive against the car wheels climbing the rails and will also serve the purpose of preventing the spreading of the rails as under normal conditions too often occurs.

A further object of the invention is to construct an attachment so that it will ride over switch rails and other such obstructions associated with the wheel carrying track rails.

With the above objects in view the invention consists essentially in a support suitably secured to the truck a rotatably mounted flanged guard wheel slidably mounted in respect to the frame and a striking shoe suspended from the frame and controlling the elevation of the guard wheel, the parts being arranged and constructed as hereinafter more particularly described and later pointed out in the appended claims.

In the drawings, Figure 1 is a plan view of a car truck with my device indicated in dotted lines. Fig. 2, is a side elevation of a truck with my device attached. Fig. 3, is an end view of Fig. 4. Fig. 4 is a side elevation of my device. Fig. 5 is a section taken through X—X' of Fig. 4. Fig. 6 is a section taken on the line Y—Y' of Fig. 4.

1 and 2 represent the usual main line track rails and 3 and 4 the switch rails.

5 represents the car truck supplied with the usual front and rear pairs of car wheels 6 and 7 riding on the track. As is customary these wheels carry a flange 8 on the inside, this flange riding against the inner face of the rail head.

My invention is secured to the truck in any suitable way preferably in a location adjoining the forward truck wheels. It is now described in detail.

9 and 10 represent a pair of carrying plates fastened together by suitable bolts 11, 12, 13 and 14 fitted with spacing sleeves 14' located between the plates and holding them a set distance apart. The plates are suspended permanently from the car truck by hanger bars 15 and 16 and they form a support for movable parts shortly described. The bolts 11 and 12 project considerably beyond the plate 10 and are utilized to support a vertically disposed bearing plate 17, the plate being held in position by lock nuts 18 and 19 applied on the bolts.

20 and 21 are angle braces extending between the bolts 11 and 13 and those 12 and 14.

22 is a U-shaped bar having the inner end thereof extending downwardly more or less centrally between the plates 9 and 10 and the outer end thereof located immediately to the inner side of the bearing plate. The U-bar carries an axle 23 on which I have mounted a guard wheel 24 fitted with a flange 25, the flange being located adjacent the outer side of the rail head.

The outer end of the axle is guided in a vertically disposed slot 26 located in the bearing plate 17 while the inner end passes through and is guided in vertical slots 27 and 28 located in the plates 9 and 10.

The inner end of the U-bar 22 is formed into a foot 22' which is permanently secured to a shoe 29 in the nature of a bent bar having the ends thereof turned upwardly as best shown in Fig. 4 of the drawings.

The forward and rear ends of the shoe, which it will be noticed is parallel with the main line rails and is located to the outer side thereof, are suspended in the lowermost position by supporting bars 30 and 31 slidably fastened to the outer plate 10 by means of pairs of bolts 32 and 33 operating in slots 34 and 35 provided in the plate.

36 is a spacer bar inserted between the plate 10 and the bar 22. The lower end of the spacing bar is secured to a cross bolt 37 passing between the plates 9 and 10 and the body portion thereof is vertically slotted as indicated at 38 to allow of the raising and lowering of the axle.

When the device is applied the guard wheel and shoe hang in the lowest position as accommodated by the various slots and in this lowest position the flange 25 of the wheel lies immediately adjacent the outer face of the main line rail with the result that any climbing action of the wheels of the truck on the rail is immediately counter-acted by the action of the flange of the wheel 24 which is drawn over against the head of the rail and effectively prevents the climbing of the truck wheels and the possible derailment of the car.

It will be noticed that there is an attachment on each side of the truck, that is, one for each main line rail.

The shoe 29 is provided so that should there be an obstruction of any kind located to the side of the rail, such as a switch rail, the wheel 24 will be raised to clear the obstruction.

Referring to Fig. 1 it will be seen that if the truck be advanced to the switch rail 3 the front end of the shoe will climb onto the switch rail gradually and in climbing will carry up the wheel 24 so that the said wheel will ride over the switch rail. The position which these parts occupy when riding the switch rail is shown best in Fig. 5. As soon as the switch rail is clear the parts drop by gravity to the normal position.

What I claim as my invention is:—

1. The combination with track rails and a car truck provided with the usual flanged wheels riding on the rails and supporting the truck, of a support permanently secured to the truck, a guard wheel slidably mounted in the support and having the periphery thereof located immediately to the outside of the rail head and means carried by the support and associated with the wheel and designed to raise the wheel to pass the same over an obstruction engaged by the latter means, as and for the purpose specified.

2. The combination with track rails and a car truck provided with the usual flanged wheels riding on the rails and supporting the truck of a support permanently secured to the truck, a wheel slidably mounted in the support and having the periphery thereof located immediately to the outside of the rail head, and a movable shoe suspended from the support and associated with the wheel and designed to raise the same to pass the same over an obstruction engaged by the shoe, as and for the purpose specified.

3. The combination with track rails and a car truck provided with the usual flanged wheels riding on the rails and supporting the truck of a support permanently secured to the truck, a wheel slidably mounted in the support and having the periphery thereof located immediately to the outside of the rail head, a longitudinally disposed shoe having up-turned ends slidably suspended from the support and a connection between the shoe and the wheel, said connection being designed to raise the wheel to pass the same over an obstruction engaged by the shoe, as and for the purpose specified.

Signed at Hague this 29th day of Sept., 1914.

JOHANN J. PETERS.

In the presence of—
  C. P. UNRUH,
  BERTHA UNRUH.